(12) United States Patent
Taylor et al.

(10) Patent No.: US 10,309,445 B2
(45) Date of Patent: Jun. 4, 2019

(54) NET SHAPED FORGINGS FOR POWER GENERATION/TRANSFER SHAFTS

(71) Applicant: ELLWOOD NATIONAL INVESTMENT CORP., Wilmington, DE (US)

(72) Inventors: Brian C. Taylor, Aliquippa, PA (US); Manas P. Shirgaokar, Cortland, OH (US); Erik J. Soderstrom, Sharpsville, NC (US); Gerhard Epp, Canfield, OH (US)

(73) Assignee: ELLWOOD NATIONAL INVESTMENT CORP., Wilmington, DE (US)

( * ) Notice: Subject to any disclaimer, the term of this patent is extended or adjusted under 35 U.S.C. 154(b) by 411 days.

(21) Appl. No.: 14/829,231

(22) Filed: Aug. 18, 2015

(65) Prior Publication Data

US 2016/0052044 A1 Feb. 25, 2016

Related U.S. Application Data

(60) Provisional application No. 62/048,500, filed on Sep. 10, 2014, provisional application No. 62/039,062, filed on Aug. 19, 2014.

(51) Int. Cl.
*B21J 5/08* (2006.01)
*F16C 3/02* (2006.01)
*H02K 15/02* (2006.01)
*H02K 7/00* (2006.01)
(Continued)

(52) U.S. Cl.
CPC ............. *F16C 3/02* (2013.01); *B21J 5/008* (2013.01); *B21J 5/08* (2013.01); *B21K 1/12* (2013.01); *H02K 7/003* (2013.01); *H02K 15/02* (2013.01)

(58) Field of Classification Search
CPC ....... B21J 1/06; B21J 5/008; B21J 5/08; B21J 9/06; B21J 9/08; B21J 13/12; B21J 1/04; B21J 5/02; B21K 1/06; B21K 1/12; F16C 3/02
See application file for complete search history.

(56) References Cited

U.S. PATENT DOCUMENTS 537,677 A * 4/1895 Mason ................ B66B 5/20
187/367
3,842,644 A * 10/1974 Biesmans .............. B21J 5/08
219/637

(Continued)

FOREIGN PATENT DOCUMENTS

JP 55-126340 A * 9/1980 ............. B21K 1/06
JP 5-237584 A * 9/1993 ............. B21K 1/06

*Primary Examiner* — Edward T Tolan
(74) *Attorney, Agent, or Firm* — Cafardi, Ferguson, Wyrick, Weis + Stotler LLC

(57) ABSTRACT

An embodiment includes a method for net shape forging of a large rotor shaft that includes a reduced central cylindrical section and integrally forged segments along the longitudinal length thereof. In an embodiment, the net shaped forging is produced by sequentially pressing the work piece such that a near net shaped forging of the machined work piece is produced, including upset geometries such as eccentric or concentric disks. This permits a reduction in waste material (e.g., due to the machining process) and improves the strength of the upset geometries. Other aspects are described and claimed.

11 Claims, 4 Drawing Sheets

(51) Int. Cl.
*B21J 5/00* (2006.01)
*B21K 1/12* (2006.01)

(56) References Cited

U.S. PATENT DOCUMENTS

| | | | | |
|---|---|---|---|---|
| 4,317,355 A * | 3/1982 | Hatsuno | ................. | B21J 5/08 29/888.08 |
| 4,399,681 A * | 8/1983 | Hatsuno | ................. | B21J 1/06 72/342.94 |
| 4,571,977 A * | 2/1986 | Ueno | ................. | B21J 5/08 72/342.94 |
| 4,838,062 A * | 6/1989 | Prenn | ................. | B21J 1/06 72/318 |
| 4,885,927 A * | 12/1989 | Corkin | ................. | B21J 5/08 72/342.1 |
| 5,230,134 A * | 7/1993 | Laue | ................. | B21D 53/88 29/428 |
| 7,360,387 B2 * | 4/2008 | Otaki | ................. | B21J 5/08 72/353.2 |
| 2008/0202189 A1 * | 8/2008 | Otaki | ................. | B21J 5/08 72/342.94 |
| 2009/0223271 A1 * | 9/2009 | Otaki | ................. | B21J 1/06 72/356 |

* cited by examiner

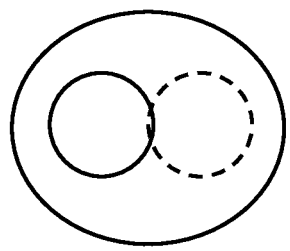
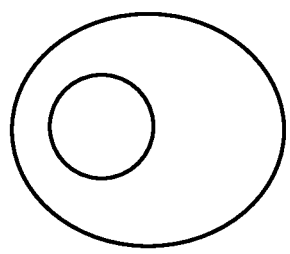
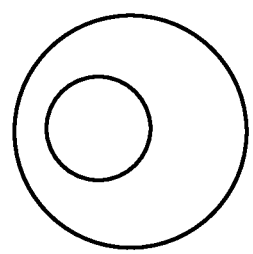
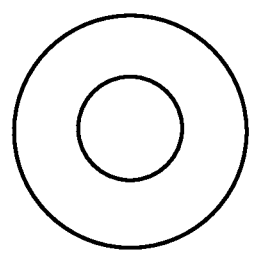
Section A-A
Possible Geometries
FIG. 1B

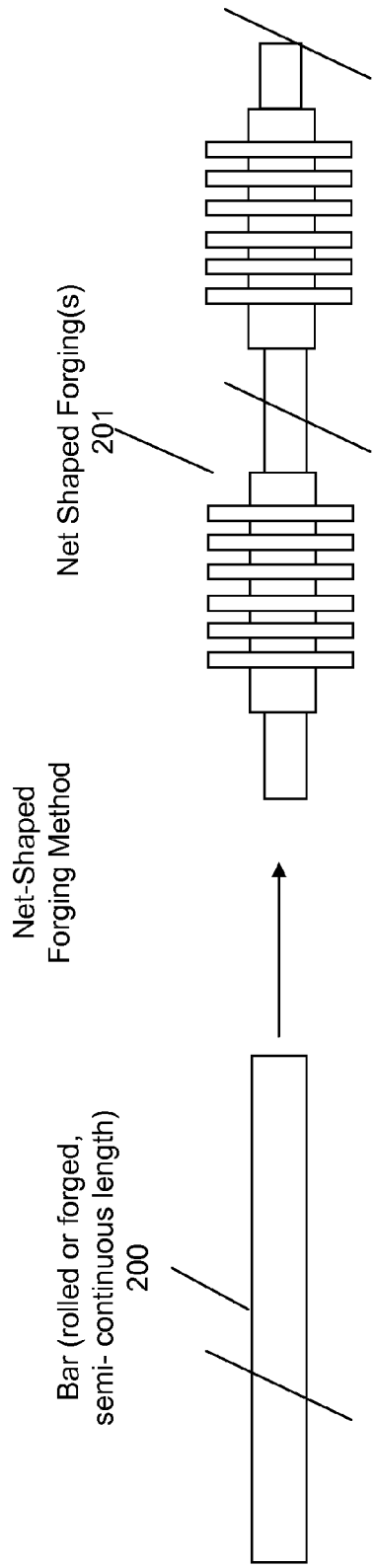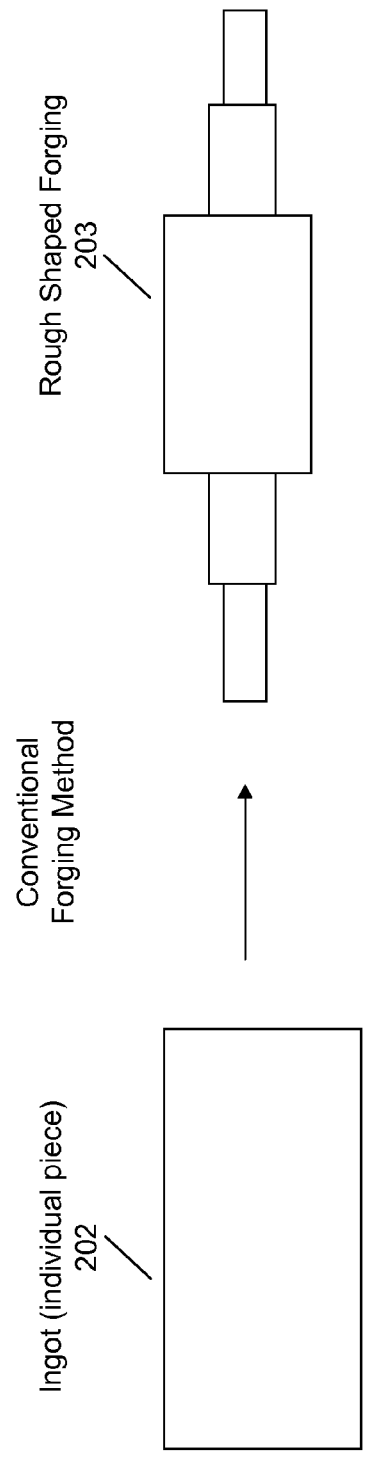

NET SHAPED FORGINGS FOR POWER GENERATION/TRANSFER SHAFTS

CLAIM FOR PRIORITY

This application claims priority to U.S. Provisional Application No. 62/039,062 filed on Aug. 19, 2014 entitled "NET SHAPED FORGINGS FOR POWER GENERATION/TRANSFER SHAFTS" and to U.S. Provisional Application No. 62/048,500 filed on Sep. 10, 2014 entitled "NET SHAPED FORGINGS FOR POWER GENERATION/TRANSFER SHAFTS," both prior applications are incorporated by reference herein.

BACKGROUND

Forging is a manufacturing process where metal is pressed, pounded or squeezed (these terms are used interchangeably herein) under great pressure into high strength parts known as forgings. The process is normally (but not always) performed hot by preheating the metal to a desired temperature before it is worked.

The forging process can create parts that are stronger than those manufactured by any other metalworking process. This is why forgings are almost always used where reliability and human safety are critical. Forgings are often used as component parts contained inside assembled items such as ships, oil drilling equipment, engines, and many other kinds of equipment.

For example, current energy production incorporating nuclear, wind or thermal power plants employ large-scale turbine/electric motor generator systems. Within the turbine/generator system is a large, high speed rotating shaft, designated as the rotor. The complete rotor train within these power plants includes the high, intermediate, and low pressure turbine rotors, in combination with the generator rotor. Products that are in these areas that may be forged include, but are not limited to 1) solid 2-pole and 4-pole rotors for generators and motors, 2) gas generator rotors, 3) steam generator rotors, 4) wind generator rotors, 5) hydro turbine rotors, 6) aero derivative turbine shafts utilizing solid step forgings (due to limitations of conventional open die forging of ingot steel).

Forgings are typically completed by subjecting the forging to a machining or finishing process. The process of machining removes excess material from a forging using a machine tool.

Thus, a conventional manufacturing method for these forged rotors involves the acquisition of a cylindrical alloyed-steel forging, representative in excess of the maximum diameter and length of the finished rotor product. Sections of the forged cylinder are removed through precision machining to create a rotor geometry consisting of reduced cylindrical sections at both ends of the rotor, with a central section, precision machined to contain segmented geometries (disks) which extend to the maximum outer diameter of the rotor.

BRIEF SUMMARY

One embodiment provides a method for net shape forging of a large rotor shaft that includes an enlarged (through upsetting and offsetting) central cylindrical section with integrally forged segments along the longitudinal length thereof. In an embodiment, beginning with a single work piece (rolled or forged bar) to be net shape forged, a first area of the single work piece is pressed to shape the single work piece to a first cylindrical diameter. Continuing to an adjacent longitudinal area of the single work piece, the adjacent longitudinal area is pressed to a second cylindrical diameter, where the first and second cylindrical diameters correspond substantially to finished cylindrical diameter sizes of the central cylindrical area and a disk, respectively. Thereafter, an embodiment provides that the single work piece is continued to be shaped via pressing (upsetting and offsetting) longitudinally adjacent areas of the single work piece to upset the single work piece to a form having cylindrical diameters substantially corresponding to finished cylindrical diameters of the central cylindrical area or disks along the longitudinal length of the large rotor shaft. According to the method, a series of longitudinally spaced disks having a cylindrical diameter greater than the reduced central cylindrical area are shaped, achieving the final net shape of the finished rotor shaft including disks.

In an embodiment, the first area and the longitudinally adjacent area are substantially immediately adjacent. The pressing steps (upsetting and offsetting) may be applied as sequential pressing of the single work piece along the longitudinal length thereof. In an embodiment, the pressing steps comprise at least two simultaneous pressing steps applied to longitudinally adjacent areas of the single work piece.

Further, in an embodiment, shortening of a starting longitudinal dimension of the single work piece to a substantially shorter finished longitudinal length dimension is achieved via repeated upsetting and offsetting of the single work piece along its length. Thus, the forging process shortens the single work piece to a finished length. The shortening therefore may be achieved by sequentially shaping the longitudinally adjacent areas of the single work piece from a first end thereof to a second end thereof.

An embodiment applies a net shape forging process to a large rotor shaft, i.e., the single work piece (rolled or forged bar) shall have a beginning cross sectional dimension less than a largest finished disk's diameter, where the single work piece has a finishing central diameter of about 17 inches. By way of example, the single work piece may be a steel bar having a starting width dimension in excess of 17 inches.

The pressing steps may include repeated pressing with a press tool with intermittent rotation of the single work piece, e.g., as in an open forging process. In an embodiment, the pressing steps may include, sequentially and/or simultaneously, pressing of the single work piece in a substantially enclosed space (upsetting and offsetting), e.g., as in a closed forging process. In an embodiment, partial enclosure of an area of the work piece may be used to assist in forming the net shape of the finished rotor.

An embodiment includes a net shaped forging produced according to at least one of the methods described herein.

An embodiment includes a net shape forge.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1B illustrates example cross sectional geometries of the rotor.

FIG. 2A illustrates a starting work piece and a rough shaped forged rotor formed there-from using the conventional forging method.

FIG. 2B illustrates a starting work piece and a net shaped forged rotor formed there-from using net shape forging method, according to an embodiment.

DETAILED DESCRIPTION

Figure 1A:
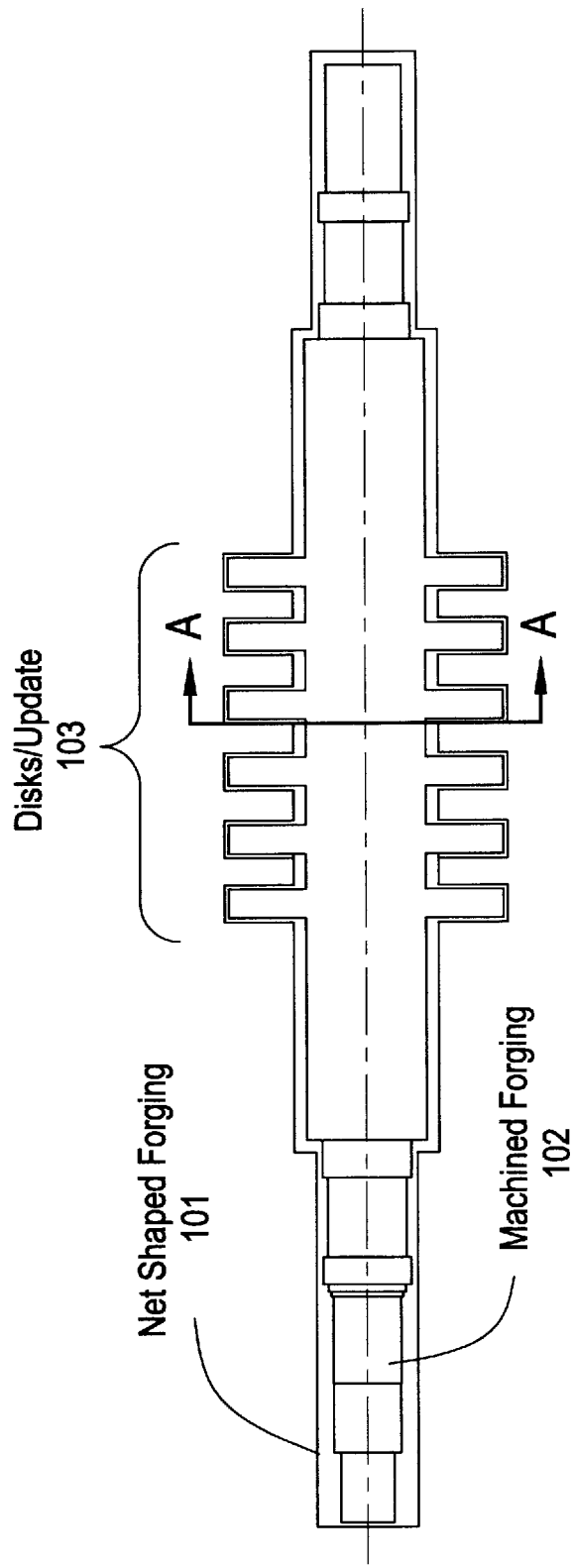
FIG. 1A illustrates an example of a net shaped forging and a machined rotor that may be formed there-from according to an embodiment.

It will be readily understood that the details of the example embodiments, as generally described and illustrated in the figures herein, may be arranged and designed in a wide variety of different ways in addition to the described example embodiments. Thus, the following more detailed description of the example embodiments is not intended to limit the scope of the claims, but is merely representative of certain example embodiments.

Reference throughout this specification to "embodiment(s)" (or the like) means that a particular feature, component, step or characteristic described in connection with the embodiment is included in at least one embodiment. Thus, appearances of the phrases "according to embodiments" or "an embodiment" (or the like) in various places throughout this specification are not necessarily all referring to the same example embodiment.

Furthermore, the described features, components, steps, or characteristics may be combined in any suitable manner in different embodiments. In the following description, numerous specific details are provided to give a thorough understanding of certain example embodiments. One skilled in the relevant art will recognize, however, that aspects can be practiced without certain specific details, or with other methods, components, materials, et cetera. In other instances, well-known structures, materials, components, steps or operations are not shown or described in detail to avoid obfuscation.

Conventional manufacturing of a finished piece from a larger forging, e.g., a rotor comprised of a larger, cylindrical alloyed-steel forging, suffers from some significant drawbacks. The machining to remove excess material from the forging (e.g., in the case of a rotor to create the segmented geometries along the central portion of the rotor length) interrupts the steel grain flow within the forging. The interruption in steel grain flow reduces the strength and fatigue limit of the finished product.

Additionally, the amount of material removal required to achieve the final geometry of the rotor is often quite significant. That is, a net shape is not formed in a conventional process for large rotors and a large amount of material is commonly removed during the machining process. For example, typical material removal may exceed over one-half the mass from the initial forging to produce the finished rotor. The machining-removal mass is rendered into the form of scrap and is unusable to the finished product. By way of example, a conventional manufacturing method may only yield one finished rotor per one as-melted steel ingot.

Accordingly, an embodiment provides an improved manufacturing method for producing a net shaped forging, particularly for power generation/transfer shafts having a diameter on the order of 15 to 20 inches or greater. According to an embodiment, a forging system (advanced forge press installation) and forge production (advanced forge die design) permit the production of alloyed-steel forgings in the net shape outline of the finished rotor product.

In an embodiment, the forging as-supplied for machining preparation of the rotor contains both the reduced central cylindrical section, and integrally forged segmented upset geometries, extending to the maximum outer diameter of the rotor. In an embodiment, the forging system provides the ability to precisely control the location and spacing of these upset geometries, optimizing both material yield and beneficial uninterrupted material grain flow in the near net geometry. Additionally, the advanced forging system permits the product design options of either uniform dimensional symmetry among the upset geometries, or individual variance, both in the form of spacing and diameter, e.g., between each upset geometry.

Improvements to conventional manufacturing of the rotor from a cylindrical alloyed-steel forging provided by this net shape forging include, but are not limited to, improvements in finished rotor strength, integrity, and fatigue endurance limits as well as efficiency of material utilization. The net shape forging, e.g., for power generation shafts, provides continuous grain flow within the forging at all locations, including the segmented upset geometry members. No longer is the forged steel grain flow interrupted by the machining required to establish each disk member.

In terms of efficiency, the material utilization of net shape forging for power generation shafts permits minimal excess material to be removed during process machining to yield the finished rotor. Each rolled or forged steel bar may now yield multiple finished rotor products.

Additional products that receive the benefits of improved product performance and material utilization efficiency from this net shape forging also include, but are not limited to, any rotating shaft converting mechanical energy into electricity, or transmitting power to a secondary rotor, including 1) forged fan shaft rotors, 2) mud, frack and slurry pump crankshafts, 3) single or double eccentric lobe single or double traditional web-pin-web crankshafts, 4) crusher shafts utilized in mineral processing 5) compressor crankshafts used in gas or air compression, 6) open die forged engine cranks whereby the mass is forged twisted or mechanically twisted into angularity and 7) traditional mechanically offset net near shape engine cranks whereby the cover stock can be greatly reduced.

The illustrated example embodiments will be best understood by reference to the figures. The following description is intended only by way of example, and simply illustrates certain example embodiments.

Referring to FIG. 1A, an overview illustration of a net shaped forging 101 as compared to its machined forging counterpart 102 is illustrated. As can be seen in FIG. 1, the net shaped forging 101 is near net shape such that the machining process does not have to remove large amounts of excess material to form the finished, machined work piece 102.

As may be appreciated from FIG. 1A, the net shaped forging 101 includes a series of disks 103 (which may include other upset geometries). The disks, as well as the other contours of the machined forging 102 are included in the net shaped forging 101 such that the forging does not need to undergo extensive machining to produce the disks 103 after the forging process has completed. Thus, the disks 103 are integral to the forging such that the steel's grain flow is maintained from the forging process, improving the strength of the finished rotor and allowing the benefits of the forging process to be maintained.

FIG. 1B includes example cross-sectional geometries of the rotor along section A-A of FIG. 1A. As illustrated, the central rotor diameter (inner circle) is reduced as compared to the upsets or disks (outer periphery). These net shape geometries are formed by the net shape forging process described herein such that the inner or central diameter, illustrated in FIG. 1B, need not be heavily machined in finish processing of the forged work piece.

FIG. 2A is provided to illustrate a high level view of the production of a net shaped forging 201 from a single work piece, here a single steel bar (rolled or forged) 200. As may be understood by reference to FIG. 1 and FIG. 2A collectively, the net shaped forging 201 is essentially in a net shaped geometry of the machined work piece such that machining processes applied to the net shaped forging 201 are minimal, and multiple net-shaped geometries (collectively 201) may be formed along the work piece (bar) 200 length as are practicable.

The conventional method is detailed in FIG. 2B by contrast. Here, one ingot 202 is used to produce a large oversize step forging 203. As is readily apparent, the step forging 203 must undergo heavy finish processing, with machining removing a large amount of material to form a finished work piece.

Additionally, an embodiment allows either the use of a smaller starting work piece 200 and/or the production of more than one finished work piece (e.g., rotor) in a net shape from the single work piece 200. Again, this is because the net shape forging process described herein allows for more efficient usage of starting material such that the amount to be machined away in finishing processing is greatly reduced.

Figure 3:
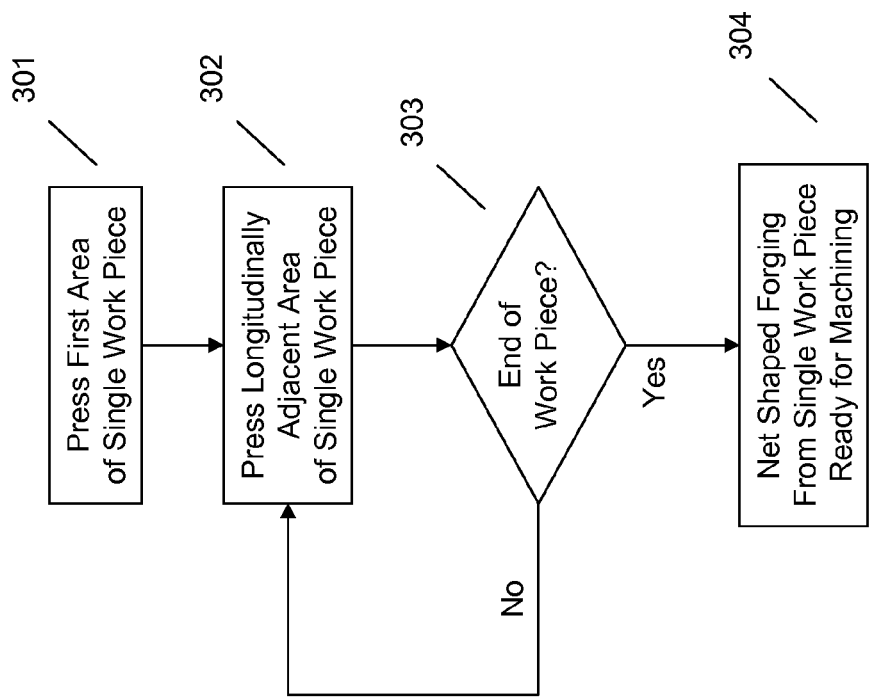
FIG. 3 illustrates an example method of net shape forging of a large rotor shaft.

In terms of forming a net shaped forging from a single work piece, FIG. 3 illustrates a high level overview of the process. An embodiment implements a method for net shape forging of a large rotor shaft that includes a reduced central cylindrical section and integrally forged segments along the longitudinal length thereof. In an embodiment, a heated single work piece, e.g., steel bar 200, is processed lengthwise via repeated pressing (including application of shaped presses depending on the geometry to be formed) along its length to build up the net shape of the forging.

By way of example, beginning with a single work piece to be net shape forged, the work piece is first pressed at a first area 301, e.g., at one of its longitudinal ends, to shape the single work piece to a first cylindrical diameter. It will be appreciated that the first cylindrical diameter as well as the other diameters and/or dimensions referred to herein are approximate and are over-sized, as final machining and finishing processes will form the finished rotor from the net shape produced.

The pressing the first area at 301 has the effect of upsetting and offsetting and shortening (compressing) the original work piece (bar 200) length, extending its width or cross section to a larger cross-sectional dimension in the area a disk or other upset is to be formed. As described herein, a prime example of the net shape forging process used herein is the production of a rotor that requires less machining. In this context, a cylindrical shape is formed in the first area, e.g., via repeated pressing with turning or via pressing in one or more circumferential press pieces. This reduces the work piece's original length to a shorter dimension and pushes material of the work piece outward longitudinally to form the upsets.

Following the shaping of the first area at 301, which may of course include shaping or partial shaping of a longitudinally adjacent second area of the work piece, depending on the pressing element or tool applied to the first area given the nature of the rotor to be forged, an adjacent second area of the single work piece is pressed at 302. This permits again the work piece to be incrementally shaped into a near net shape. For example, in an area adjacent to a disk or other upset geometry, the work piece may be pressed to a smaller central diameter.

As will be understood, the continual shaping of the work piece to press areas outwardly from the original bar reduces the original work piece length due to the lateral expansion. It will be understood that the first area (or adjacent areas, etc.) may need to be stabilized by a pressing or stabilizing element applied to the first area during the pressing of the second adjacent area at 302. In this way, the work piece may be formed into the net shape desired for the rotor as it is shaped sequentially along its length.

The process continues along the length of the work piece, gradually forming up the near net shape of the rotor and at 303 it is determined if the distal end of the rotor has been reached. This determination, as with others (e.g., the location of the upsets, whether compression of the bar for outward expansion or pressing to form a central diameter portion is required, etc.), may be accomplished by virtue of consulting a plan of instructions for the net shaped forging, e.g., loaded into the pressing forge. This informs the pressing machinery of which motions and pressures to apply to the work piece, and when, which pressing piece(s) to move, when and where, such that the work piece may be gradually reduced in lengthwise dimension and shaped into the net shape via the forging process. This may include moving the work piece to reposition it with respect to a pressing element, e.g., moving the work piece length wise and/or rotating the work piece. This may also include moving a pressing element of the press forge to contact another, e.g., adjacent, portion of the work piece. Such instructions may be stored in a memory or other storage device that is accessible to a processor operatively coupled to the forge.

If the end of the rotor has been reached, i.e., the last or distal end has been shaped, the net shaped forging is complete and is ready to be processed by machining and finishing. Otherwise, the process continues to a next pressing step, e.g., pressing of an adjacent area, or the continuation of net-shape forging of an additional component.

Thus, the pressing continues to shape adjacent longitudinal areas of the single work piece. This permits pressing the adjacent longitudinal area, e.g., to a second cylindrical diameter, where for example the first and second cylindrical diameters correspond substantially to finished cylindrical diameter sizes of the central cylindrical area and an adjacent disk integrally formed therewith, respectively. An embodiment thus allows for integral formation of disks with a rotor shaft by shaping a series of longitudinally spaced disks having a cylindrical diameter greater than the reduced central cylindrical area.

The sequential lengthwise pressing of the single work piece along the longitudinal length thereof may of course include at least two simultaneous pressing steps applied to longitudinally adjacent areas of the single work piece. For example, in forming a disk, the pressing tool may apply a deeper press to form a central diameter dimension with a previously formed disk adjacent thereto, with stabilizing being applied to the adjacent disk. Also, the pressing tool may form both the disk(s) and the reduced central diameter of the rotor simultaneously or nearly so, in whole or in part.

Such net shape forging may be applied to form large net shaped forging such as concentric or eccentric rotating shafts having a finished central (inner) diameter of at least 17 inches. This processing allows the net shaped forging to be of a near net geometry such that material use is maximized and efficient machining processes can be implemented.

As will be understood, the forge itself may be computerized such that the repeated pressing motions, e.g., of a pressing tool or tools to sequentially shape the rotor, are automated according to an instruction set, for example stored in a memory of the forge or a device accessible thereby, for the particular rotor and/or the particular beginning work piece. In this regard, it will be understood that a hydraulic or other like mechanism may be operated by a processor executing instructions according to the forging plan being implemented. This may include movements not only of the pressing tool but movements of other forge elements, such as elements that reposition the work piece as it is pressed.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the specification there has been set forth example embodiments and, although specific terms are used, the description thus given uses terminology in a generic and descriptive sense only and not for purposes of limitation.

Finally, any numerical parameters set forth in the specification and claim(s) are approximations (for example, by using the term "about" or the phrase "at least" and the like) that may vary depending upon the desired properties sought to be obtained by the embodiment(s). At the very least, each numerical parameter should at least be construed in light of the number of significant digits and by applying ordinary rounding.

What is claimed is:

1. A method for net shape forging of a large rotor shaft that includes a reduced central cylindrical section and integrally forged segments along the longitudinal length thereof, comprising:

with a single work piece having a cross sectional area and to be net shaped forged, pressing, using a pressing element, a first area of the single work piece to compress the first area of the single work piece lengthwise to a first disk diameter;

moving from the first area of the single work piece and continuing to an adjacent longitudinal area of the single work piece and pressing the adjacent longitudinal area to a second cylindrical diameter, where the first disk diameter and second cylindrical diameter correspond substantially to finished cylindrical diameter sizes of a first disk and a central cylindrical area, respectively, wherein the moving comprises at least one of: moving the single work piece length-wise such that the adjacent longitudinal area is positioned at the pressing element and moving the pressing element to the adjacent longitudinal area; and thereafter moving from a previous area of the single work piece and continuing the pressing of the single work piece to longitudinally compress adjacent areas of the single work piece to upset the single work piece to a form having cylindrical diameters substantially corresponding to finished cylindrical diameters of the central cylindrical area or disks along the longitudinal length of the large rotor shaft, wherein at least one of the cylindrical diameters is greater than the cross sectional area of the single work piece;

said method shaping a series of longitudinally spaced disks having a cylindrical diameter greater than the reduced central cylindrical area.

2. The method of claim 1, wherein the first area and the longitudinally adjacent area are substantially immediately adjacent.

3. The method of claim 1, wherein the pressing steps comprise sequential pressing of the single work piece along the longitudinal length thereof.

4. The method of claim 1, wherein the pressing steps comprise at least two simultaneous pressing steps applied to longitudinally adjacent areas of the single work piece.

5. The method of claim 1, wherein said pressing steps shorten a starting longitudinal dimension of the single work piece to a substantially shorter finished longitudinal length dimension via repeated upsetting of the single work piece along its length.

6. The method of claim 5, wherein said shortening is achieved by sequentially shaping longitudinally adjacent areas of the single work piece from a first end thereof to a second end thereof.

7. The method of claim 1, wherein the single work piece has a beginning cross sectional dimension substantially less than the largest finished disk.

8. The method of claim 7, wherein the single work piece is a rolled steel bar.

9. The method of claim 7, wherein the single work piece is a forged steel bar.

10. The method of claim 1, wherein the single work piece is a steel bar having a starting diameter of about 17 inches.

11. The method of claim 1, wherein said pressing steps comprise repeated pressing with a press tool with intermittent rotation of the single work piece.

* * * * *